United States Patent
Lee et al.

(10) Patent No.: US 9,966,579 B2
(45) Date of Patent: May 8, 2018

(54) RECHARGEABLE BATTERY

(71) Applicant: SAMSUNG SDI CO., LTD., Yongin-si, Gyeonggi-do (KR)

(72) Inventors: Jun-Yong Lee, Yongin-si (KR); Sang-Won Byun, Yongin-si (KR); Byung-Kyu Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days. days.

(21) Appl. No.: 15/196,002

(22) Filed: Jun. 28, 2016

(65) Prior Publication Data

US 2017/0149030 A1     May 25, 2017

(30) Foreign Application Priority Data

Nov. 25, 2015  (KR) .................. 10-2015-0165716

(51) Int. Cl.
*H01M 2/08*     (2006.01)
*H01M 2/12*     (2006.01)
(Continued)

(52) U.S. Cl.
CPC ............. *H01M 2/08* (2013.01); *H01M 2/026* (2013.01); *H01M 2/0262* (2013.01); *H01M 2/0267* (2013.01); *H01M 2/043* (2013.01); *H01M 2/0404* (2013.01); *H01M 2/0486* (2013.01); *H01M 2/12* (2013.01); *H01M 2/263* (2013.01);
(Continued)

(58) Field of Classification Search
CPC ....... H01M 2/202; H01M 2/204; H01M 2/206
See application file for complete search history.

(56) References Cited

U.S. PATENT DOCUMENTS 5,432,017 A * 7/1995 Hassemer .............. B29C 65/08
                                                              29/623.4
2010/0075221 A1 * 3/2010 Mehta ................. H01M 2/0257
                                                                429/178
(Continued)

FOREIGN PATENT DOCUMENTS

| EP | 2482364 A1 | 8/2012 |
|---|---|---|
| KR | 10-2014-0094205 A | 7/2014 |
| KR | 10-2014-0099846 A | 8/2014 |
| KR | 10-2015-0039290 A | 4/2015 |

OTHER PUBLICATIONS

EPO Extended Search Report dated Mar. 7, 2017, for corresponding European Patent Application No. 16179587.7 (14 pages).
(Continued)

*Primary Examiner* — Olatunji Godo
(74) *Attorney, Agent, or Firm* — Lewis Roca Rothgerber Christie LLP (57) ABSTRACT

A rechargeable battery includes: an electrode assembly including a first electrode, a separator, and a second electrode; a case accommodating the electrode assembly and having an opening at a side thereof for receiving the electrode assembly; a cap assembly coupled to the case at the opening; a first insulation member surrounding the case, an extending portion of the first insulation member extending above the cap assembly; and a second insulation member on the cap assembly and contacting the portion of the first insulation member extending above the cap assembly, the second insulation member being a coated layer.

8 Claims, 9 Drawing Sheets

(51) Int. Cl.
| | |
|---|---|
| *H01M 2/30* | (2006.01) |
| *H01M 2/04* | (2006.01) |
| *H01M 2/02* | (2006.01) |
| *H01M 2/34* | (2006.01) |
| *H01M 10/04* | (2006.01) |
| *H01M 2/26* | (2006.01) |

(52) U.S. Cl.
CPC ............ *H01M 2/30* (2013.01); *H01M 2/305* (2013.01); *H01M 2/345* (2013.01); *H01M 10/0431* (2013.01); *H01M 2200/20* (2013.01); *H01M 2220/20* (2013.01); *H01M 2220/30* (2013.01)

(56) References Cited

U.S. PATENT DOCUMENTS

| | | |
|---|---|---|
| 2014/0205895 A1 | 7/2014 | Kim et al. |
| 2014/0227564 A1 | 8/2014 | Song et al. |
| 2014/0302384 A1 | 10/2014 | Park et al. |
| 2014/0329138 A1 | 11/2014 | Park et al. |

OTHER PUBLICATIONS

EPO Partial Search Report dated Nov. 7, 2016, for corresponding European Patent Application No. 16179587.7 (9 pages).
EPO Office Action dated Feb. 13, 2018, for corresponding European Patent Application No. 16179587.7 (5 pages).

* cited by examiner

RECHARGEABLE BATTERY

CROSS-REFERENCE TO RELATED APPLICATION

This application claims priority to and the benefit of Korean Patent Application No. 10-2015-0165716, filed in the Korean Intellectual Property Office on Nov. 25, 2015, the entire content of which is incorporated herein by reference.

BACKGROUND

1. Field

The described technology relates generally to a rechargeable battery.

2. Description of the Related Art

A rechargeable battery is a battery that is designed to be repeatedly charged and discharged, unlike a primary battery that is not designed to be recharged. A low-capacity rechargeable battery has been used in small, portable electronic devices, such as a mobile phone, a laptop computer, and a camcorder, and a large-capacity rechargeable battery has been widely used as a power supply for, as one example, driving a motor of a hybrid car.

The rechargeable battery includes an electrolyte solution received in a case together with a positive electrode, a separator, and a negative electrode. The case may have various shapes, such as a rectangular shape, a pouch shape, or a circular or cylindrical shape.

Among the various types of cases, an inside of a case made of a metallic material, such as aluminum, is blocked and sealed after an electrode assembly is received therein by a cap plate.

However, the metallic case may not be perfectly or completely sealed, thereby causing a problem, due to an assembly allowance or tolerance between the cap plate and the case.

The above information disclosed in this Background section is for enhancement of understanding of the background of the described technology, and therefore, it may contain information that does not form the prior art that is already known to a person of ordinary skill in the art.

SUMMARY

Aspects of the described technology provide a rechargeable battery with an increased sealing force (e.g., an improved seal) between a cap plate and a case.

An exemplary embodiment provides a rechargeable battery including: an electrode assembly including a first electrode, a separator, and a second electrode; a case accommodating the electrode assembly, and having an opening at a side thereof for receiving the electrode assembly; a cap assembly coupled to the case at the opening; a first insulation member surrounding the case, an extending portion of the first insulation member extending above the cap assembly; and a second insulation member on the cap assembly and contacting the extending portion of the first insulation member, the second insulation member being a coated layer.

The second insulation member may contact an inner side of the extending portion.

The cap plate may further include a cap plate, and the cap plate may include a vent member. The vent member may be exposed through the second insulation member.

The cap plate may further include an embankment around a periphery of the vent member.

An upper end of the extending portion and an upper end of the embankment may have substantially the same height above the cap plate.

The embankment may be formed by pressing a bottom surface of the cap plate.

The first insulation member may include a thermal bonding layer configured to be melted at a side thereof facing toward the case.

The cap assembly may include a cap plate, and the cap plate may include: a first electrode terminal on the cap plate, and electrically connected to the first electrode through a first terminal connecting member; a second electrode terminal on the cap plate, and electrically connected to the second electrode through a second terminal connecting member; and an upper insulation member between the second electrode terminal and the case.

A thickness of the second insulation member may be the same as or less than a thickness of the upper insulation member.

The first insulation member may be a sheet and, when the first insulation member surrounds the case, the first insulation member may have an overlapped portion on a lateral side of the case where the first insulation member overlaps itself.

According to an embodiment, when the insulation layer is formed by coating the cap plate, the sealing force between the cap plate and the case of the rechargeable battery may be increased to protect components arranged inside the case from external moisture.

DETAILED DESCRIPTION

Aspects of the present invention will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification and drawings.

In addition, the size and thickness of components shown in the drawings may be arbitrarily shown for better understanding and ease of description, and the present invention is not limited thereto. For example, in the drawings, the thickness of layers, films, panels, regions, etc. may be exaggerated or enlarged for clarity and ease of description.

It will be understood that when an element or layer is referred to as being "on," "connected to," or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements.

As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

A rechargeable battery according to exemplary embodiments will now be described in detail with reference to accompanying drawings.

Figure 1:
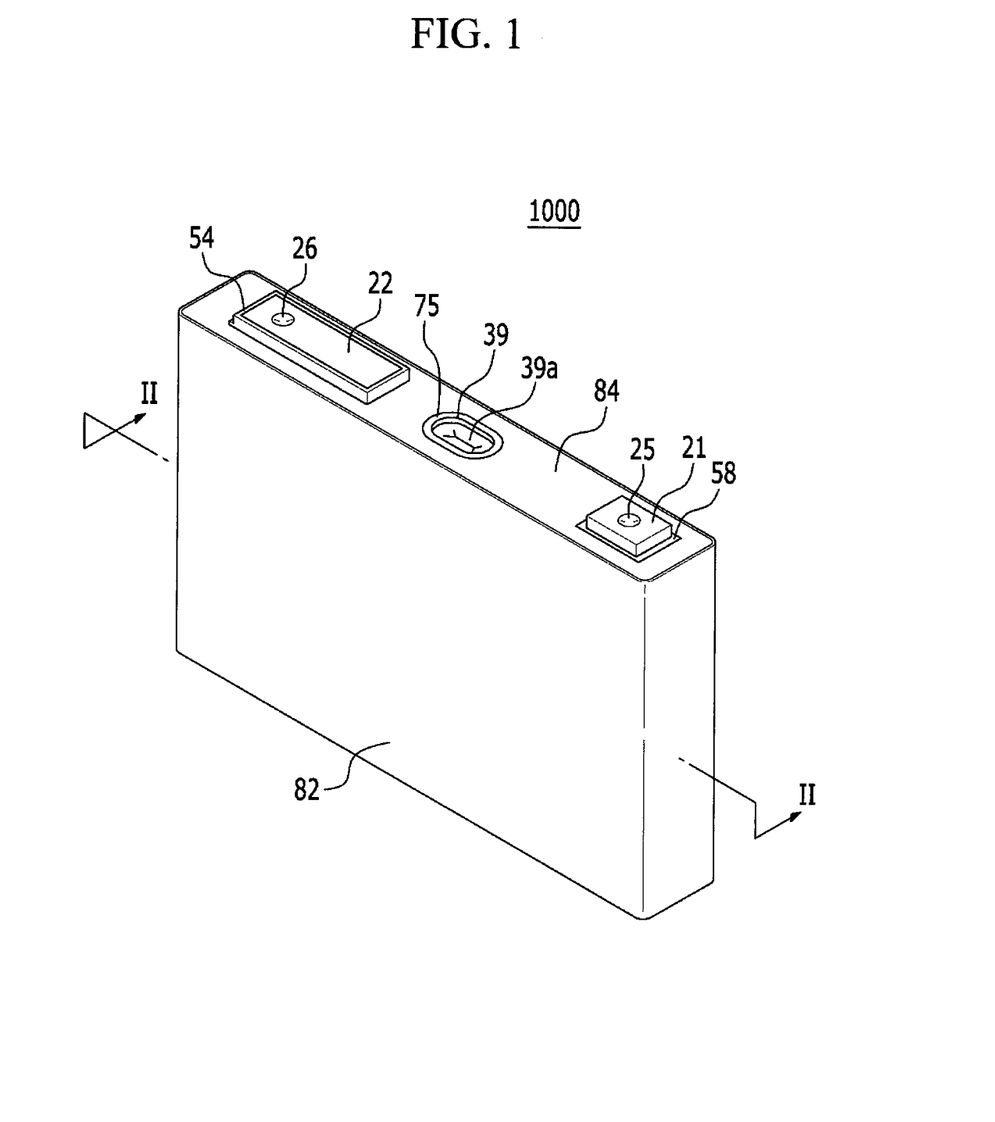
FIG. 1 shows a perspective view of a rechargeable battery according to an exemplary embodiment.
Figure 2:
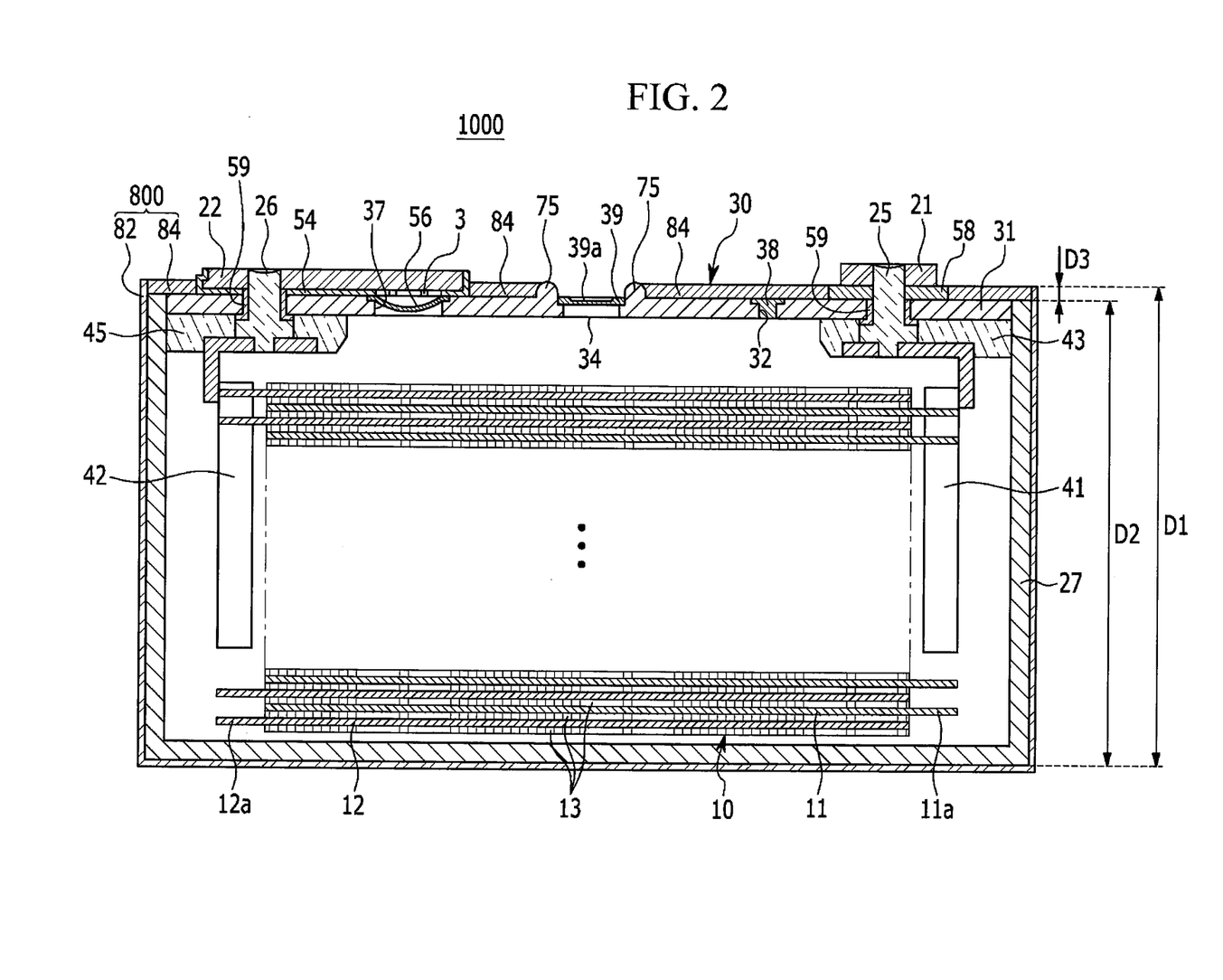
FIG. 2 shows a cross-sectional view of the rechargeable battery illustrated in FIG. 1 taken along the line II-II of FIG. 1.
Figure 3:
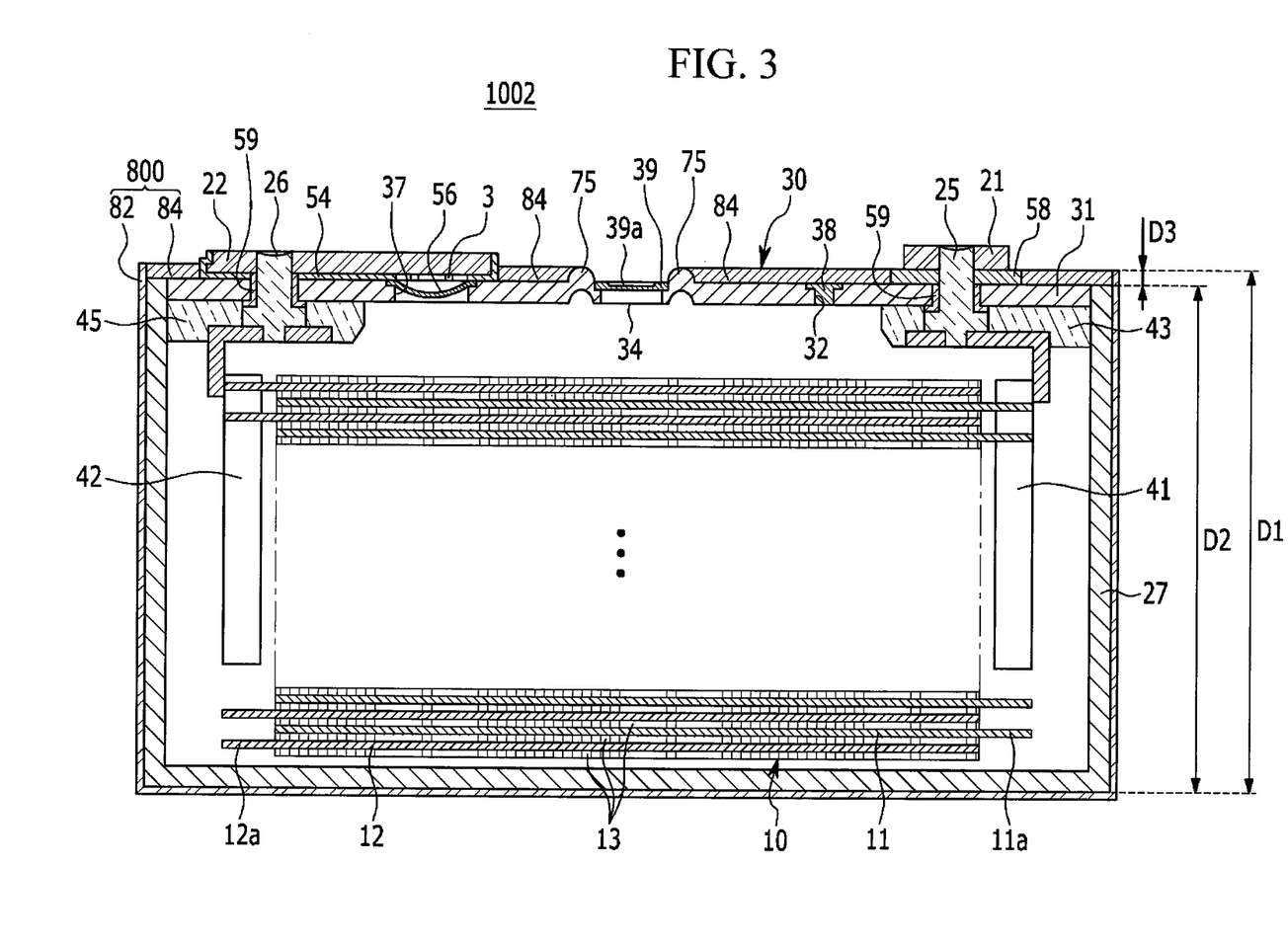
FIG. 3 shows a cross-sectional view of a rechargeable battery according to another exemplary embodiment taken along the line II-II of FIG. 1.

FIG. 1 shows a perspective view of a rechargeable battery according to an exemplary embodiment, FIG. 2 shows a cross-sectional view of the rechargeable battery illustrated in FIG. 1 taken along the line II-II of FIG. 1, and FIG. 3 shows a cross-sectional view of a rechargeable battery according to another exemplary embodiment taken along the line II-II of FIG. 1.

As shown in FIG. 1 and FIG. 2, a rechargeable battery 1000 includes an electrode assembly 10, a case 27 for receiving and accommodating the electrode assembly 10, a cap assembly 30 coupled to the case 27 at an opening thereof (e.g., installed in the opening of the case 27), and an insulation member 800 for sealing the case 27 and the cap assembly 30.

The rechargeable battery 1000 is illustrated as being a rectangular-shaped or square-shaped lithium ion secondary battery. However, the present invention is not restricted thereto, and the present invention may be applied to various types of batteries, such as a lithium polymer battery or a cylindrical battery.

The electrode assembly 10 may be a jellyroll type that is spirally wound and includes a separator 13 arranged between a first electrode (e.g., a positive electrode) 11 and a second electrode (e.g., a negative electrode) 12.

The positive electrode 11 and the negative electrode 12 each include a coated region, formed by coating an active material on a current collector made of a thin-plate metallic foil, and electrode uncoated regions 11a and 11b in which the active material is not coated. The coated region of the positive electrode 11 may be formed by coating an active material, such as a transition metal oxide, on the current collector made of a metal foil, such as aluminum, and the coated region of the negative electrode 12 may be formed by coating an active material, such as graphite or carbon, on the current collector made of a metal foil, such as copper or nickel.

The positive uncoated region 11a is provided at one-side end of the positive electrode 11 in a length direction of the positive electrode 11, and the negative uncoated region 12a is provided at one-side end of the negative electrode 12 in a length direction of the negative electrode 12.

The positive uncoated region 11a and the negative uncoated region 12a may be provided at opposite sides of the wound electrode assembly 10. The positive electrode 11 and the negative electrode 12 are spirally wound with the separator 13, that is an insulator, therebetween. More than one separator 13 may be included in the electrode assembly 10, and the positive electrode 11, the negative electrode 12, and the separator 13 may be alternately disposed (e.g., alternately stacked) and may be spirally wound. However, the present invention is not restricted to this, and the above-described electrode assembly 10 may be configured as a structure in which a plurality of sheets, including the positive electrode, the separator, and the negative electrode, are repeatedly stacked.

The electrode assembly 10 may be received in (e.g., accommodated in) the case 27 together with an electrolyte solution. The electrolyte solution may include an organic solvent, such as EC, PC, DEC, EMC, and/or EMC, and a lithium salt, such as $LiPF_6$ and/or $LiBF_4$. The electrolyte solution may be liquid, solid, or gel.

The case 27 is substantially cuboidal and includes an opening at one side thereof. The case 27 may be made of a metal, such as aluminum.

The cap assembly 30 includes a cap plate 31 coupled to (e.g., combined to) the case 27 to shut (e.g., to close and seal) the opening of the case 27, a positive terminal 21 protruding outside the cap plate 31 and electrically connected to the positive electrode 11, and a negative terminal 22 protruding outside the cap plate 31 and electrically connected to the negative electrode 12.

The cap plate 31 has a plate shape extending in a direction and is coupled to the case 27 at the opening thereof (e.g., the cap plate 31 is fitted inside the opening of the case 27). The cap plate 31 includes an injection opening 32 (e.g., an injection hole) penetrating into the inside of the case 27 (e.g., extending through the cap plate 31) and a vent opening 34 (e.g., a vent hole). The injection opening 32 is used to inject the electrolyte solution, and after the electrolyte solution is injected into the case 27, a sealing stopper 38 is arranged in the injection opening 32 to close and seal the injection opening 32. The vent opening 34 includes a vent member 39 including a notch 39a such that the vent member 39 opens or bursts at a certain pressure (e.g., at a predetermined pressure).

An embankment 75 (e.g., a ridge or protrusion) surrounds the vent member 39. The embankment 75 may protrude from an upper side or surface of the cap plate 31. The embankment 75 may be additionally provided on the cap plate 31 (e.g., the embankment 75 may be formed separately from the cap plate 31); however, it is not limited thereto, and the embankment 75 may be integrally formed with the cap plate 31.

In a rechargeable battery 1002 shown in FIG. 3, according to another embodiment, the cap plate 31 (e.g., a portion of the cap plate 31) surrounding the vent member 39 may protrude upward and have a corresponding groove at a bottom side or surface of the cap plate 31 (e.g., the embankment 75 may be formed by pressing or stamping the cap plate 31 such that a groove corresponding to the embankment 75 is formed at the bottom side or surface of the cap plate 31).

An upper end or surface of the embankment 75 and an upper end or surface of a first insulation member 82 may be coplanar.

Referring to FIG. 1 and FIG. 2, the positive terminal 21 and the negative terminal 22 are provided to protrude above a top (e.g., to protrude above an upper surface) of the cap plate 31. The positive terminal 21 is electrically connected to the positive electrode 11 with a current collecting tab 41 as a medium, and the negative terminal 22 is electrically connected to the negative electrode 12 with a current collecting tab 42 as a medium.

A terminal connecting member 25 electrically connecting the positive terminal 21 and the current collecting tab 41 to each other is installed between the positive terminal 21 and the current collecting tab 41. The terminal connecting member 25 is inserted into an opening (e.g., a hole) provided in the positive terminal 21. A top of the terminal connecting member 25 is coupled to (e.g., fixed to) the positive terminal 21 by welding, and an end thereof is fixed to the current collecting tab 41 by welding.

A gasket 59 is inserted into an opening in the cap plate 31 through which the terminal connecting member 25 passes and is arranged and seals between the terminal connecting member 25 and the cap plate 31. A lower insulation member 43, into which a bottom of the terminal connecting member 25 is inserted, is provided below or under the cap plate 31. A connection plate 58 for electrically connecting the positive terminal 21 and the cap plate 31 to each other is provided between the positive terminal 21 and the cap plate 31. The terminal connecting member 25 is inserted into (e.g., is inserted through) the connection plate 58. Accordingly, the cap plate 31 and the case 27 are charged as the positive electrode 11 (e.g., the cap plate 31 and the case 27 are positively biased).

A terminal connecting member 26 electrically connecting the negative terminal 22 and the current collecting tab 42 to each other is installed between the negative terminal 22 and the current collecting tab 42. The terminal connecting member 26 is inserted into an opening provided in the negative terminal 22. A top of the terminal connecting member 26 is fixed to the negative terminal 22 by welding, and a bottom thereof is fixed to the current collecting tab 42 by welding.

A gasket 59 is inserted into an opening in the cap plate 31 through which the terminal connecting member 26 passes and is arranged and seals between the negative terminal 22 and the cap plate 31. An upper insulation member 54 is installed between and insulates the negative terminal 22 and the cap plate 31 from each other. The terminal connecting member 26 may be inserted into an opening (e.g., a hole) in the upper insulation member 54, and the upper insulation member 54 may surround an end of the negative terminal 22.

A lower insulation member 43 for insulating the negative terminal 22 and the current collecting tab 42 from the cap plate 31 is installed below or under the cap plate 31.

A short-circuit opening 37 (e.g., a short-circuit hole) is provided in the cap plate 31, and a short-circuit member 56 is provided in the short-circuit opening 37. The short-circuit member 56 has a curved portion that is curved downwardly in a convex manner (e.g., curved downwardly toward the electrode assembly 10) and an edge portion outside (e.g., surrounding) the curved portion that is fixed to the cap plate 31. The upper insulation member 54 may include an incised portion overlapping (e.g., over) the short-circuit opening 37, and the short-circuit member 56 overlaps the negative terminal 22 (e.g., the short-circuit member 56 is arranged below the negative terminal 22), which is exposed through the incised portion.

The short-circuit member 56 is electrically connected to the cap plate 31, and it is configured to transform or deform when an internal pressure of the rechargeable battery 1000 increases (e.g., increases above a certain pressure), thereby causing a short circuit between the positive electrode and the negative electrode.

For example, when gas is generated inside the rechargeable battery due to, for example, an abnormal reaction, an internal pressure of the rechargeable battery increases. When the internal pressure of the rechargeable battery becomes greater than a certain pressure (e.g., a predetermined pressure), the curved portion transforms or deforms to be convex upward, and the negative terminal 22 contacts the short-circuit member 56 to cause a short circuit.

To ease or slow the short circuit between the negative terminal 22 and the short-circuit member 56, the negative terminal 22 may further include a protrusion 3 protruding toward the short-circuit member 56. The protrusion 3 is separated from (e.g., spaced from) the short-circuit member 56.

The case 27 and the cap assembly 30 are surrounded by an insulation member 800. The insulation member 800 includes the first insulation member 82 surrounding the case 27 and a second insulation member 84 provided on the cap plate 31.

Figure 4:
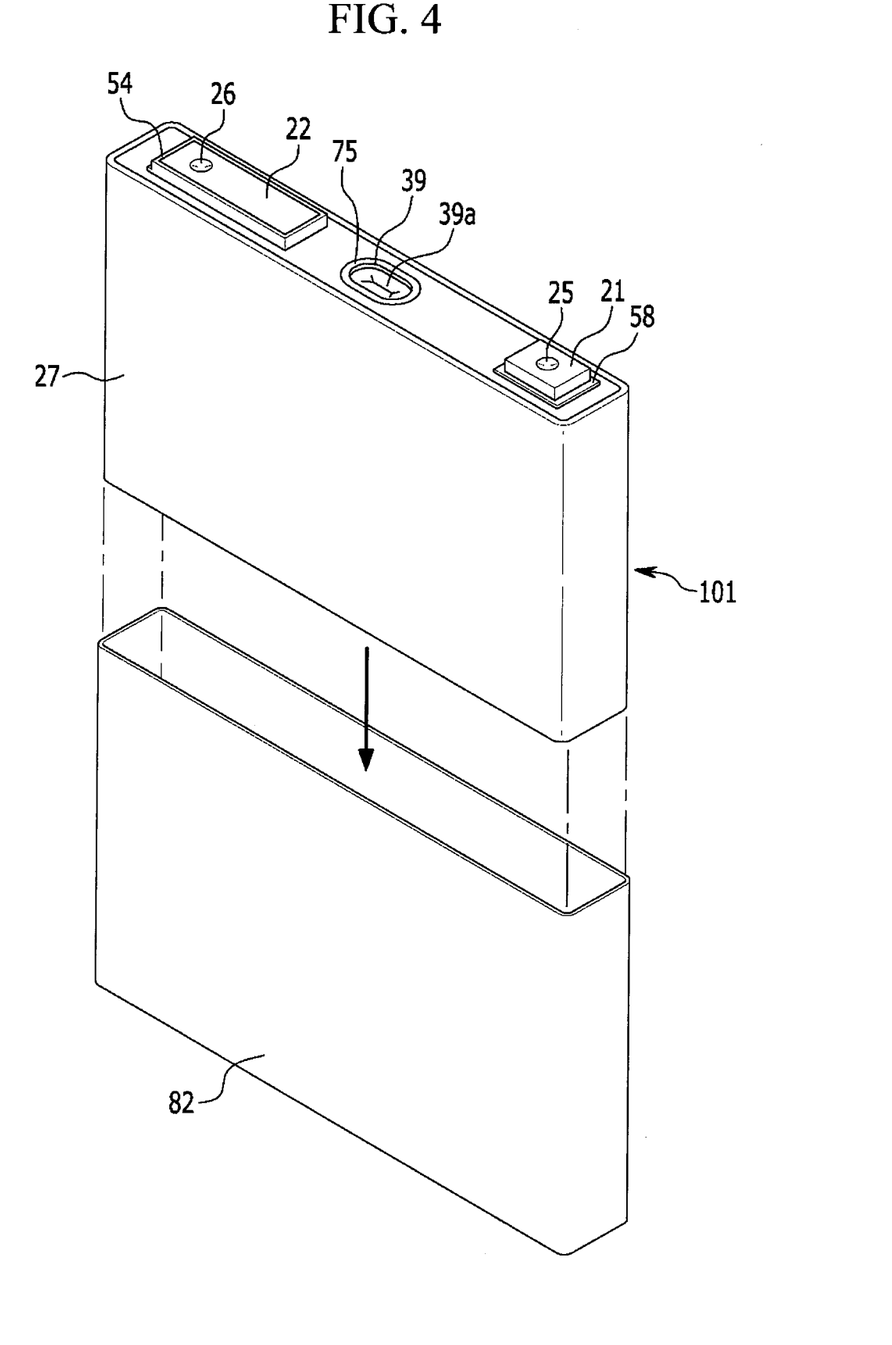
FIGS. 4-5 show perspective views of an insulation member of a rechargeable battery according to an exemplary embodiment.
Figure 5:
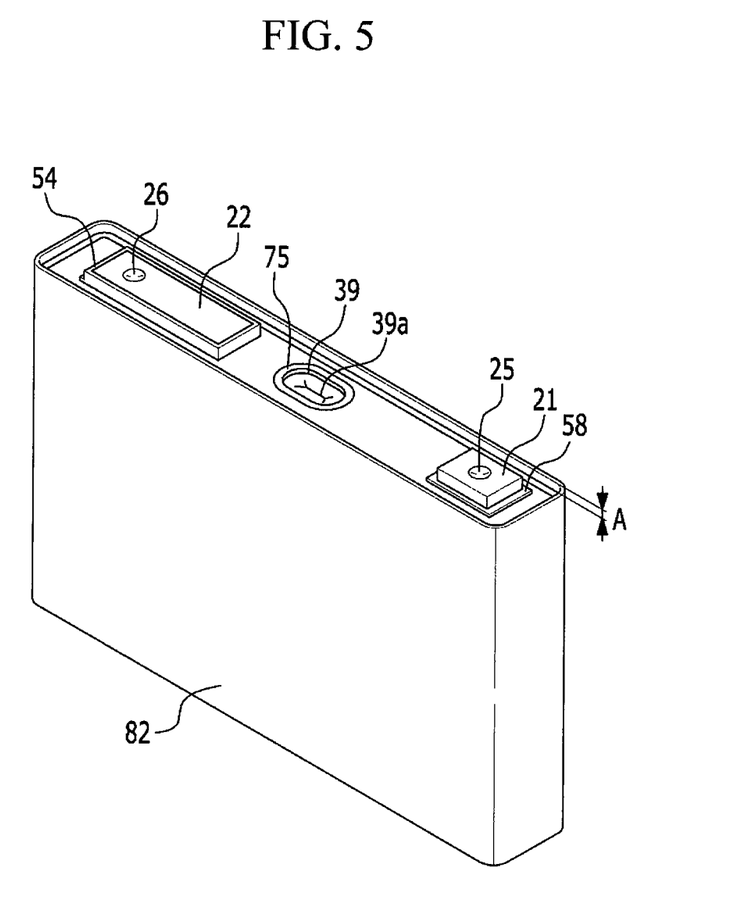

A further detailed description will now be provided with reference to FIG. 2, FIG. 4, and FIG. 5.

FIG. 4 and FIG. 5 show perspective views of the insulation member of the rechargeable battery according to an exemplary embodiment.

Referring to FIG. 2 and FIG. 4, the first insulation member 82 has a box shape including an internal space for receiving the case 27, and an opening is provided at a top of the first insulation member 82.

As shown in FIG. 4, the case 27 may be inserted inside the first insulation member 82 through the opening of the first insulation member 82. In one embodiment, the case 27 includes and accommodates an electrode assembly 10, and a cap assembly 30 is coupled to the case 27 at the opening thereof.

Referring to FIG. 2 and FIG. 5, an end of the first insulation member 82 protrudes above the top of the case 27 (e.g., an upper end of the first insulation member 82 protrudes above an upper end of the case 27 and above an upper surface of the cap plate 31). For example, a depth D1 of the internal space of the first insulation member 82 is greater than a length D2 of a side of the case 27.

The first insulation member 82 includes a thermal bonding layer on an inner side thereof that is melted by heat and/or pressure and is attached to the case 27. In another embodiment, the first insulation member 82 may be made of a material that shrinks when exposed to heat, and the first insulation member 82 may be attached to the case 27 by heat shrinking.

The second insulation member 84 may be formed by coating a fluid insulation material and curing the insulation material by using light irradiation or heat treatment.

In one embodiment, the fluid insulation material is not as thick as the positive terminal 21 and the negative terminal 22 so that it does not cover the positive terminal 21 and the negative terminal 22.

When a portion of the first insulation member 82 that protrudes above the cap assembly 30 (e.g., protrudes above the cap plate 31) is referred to as an extension (e.g., an extending portion), a height (A) of the extension may be the same as or greater than a thickness D3 of the second insulation member 84. The extension of the second insulation member 84 acts as an embankment to prevent the fluid insulation material from flowing off of the cap assembly when the fluid insulation material is coated thereon. Therefore, the thickness of the second insulation member 84 may be the same as or less than the height of the extension. If the extension is too short, the second insulation member may be thin such that its ability to protect the cap plate may be reduced.

Further, the embankment 75 surrounding the vent member 39 may be provided around the vent member 39 to prevent the insulation material from flowing into or on the vent member 39. Therefore, the vent member 39 is not covered by the second insulation member 84 but remains exposed.

When the insulation material is formed by coating a fluid material on the cap plate, the insulation material spreads to cover the cap plate. The insulation material spreads along an upper side or surface of the cap plate and contacts the extension of the first insulation member. The insulation material covers an area where the cap plate is coupled to (e.g., combined to) the case. The insulation material is cured to form the second insulation member while covering the area where the cap plate is coupled to the case.

When the second insulation member is formed using the fluid insulation material and when the area where the cap plate is coupled to the case has a crack, the second insulation member fills the crack, thereby further improving the seal between the cap plate and the case (e.g., thereby improving a sealing force of the rechargeable battery).

When the insulation member is provided, a short circuit caused by condensation may be prevented, and permeation of moisture into a surface layer of the case is sufficiently controlled to prevent corrosion.

The first insulation member may have the above-described box shape. However, it is not limited thereto, and it may be provided as a folded sheet, which will now be described with reference to FIGS. 6-9.

FIGS. 6-9 show a method for forming a first insulation member according to another exemplary embodiment.

Figure 6:
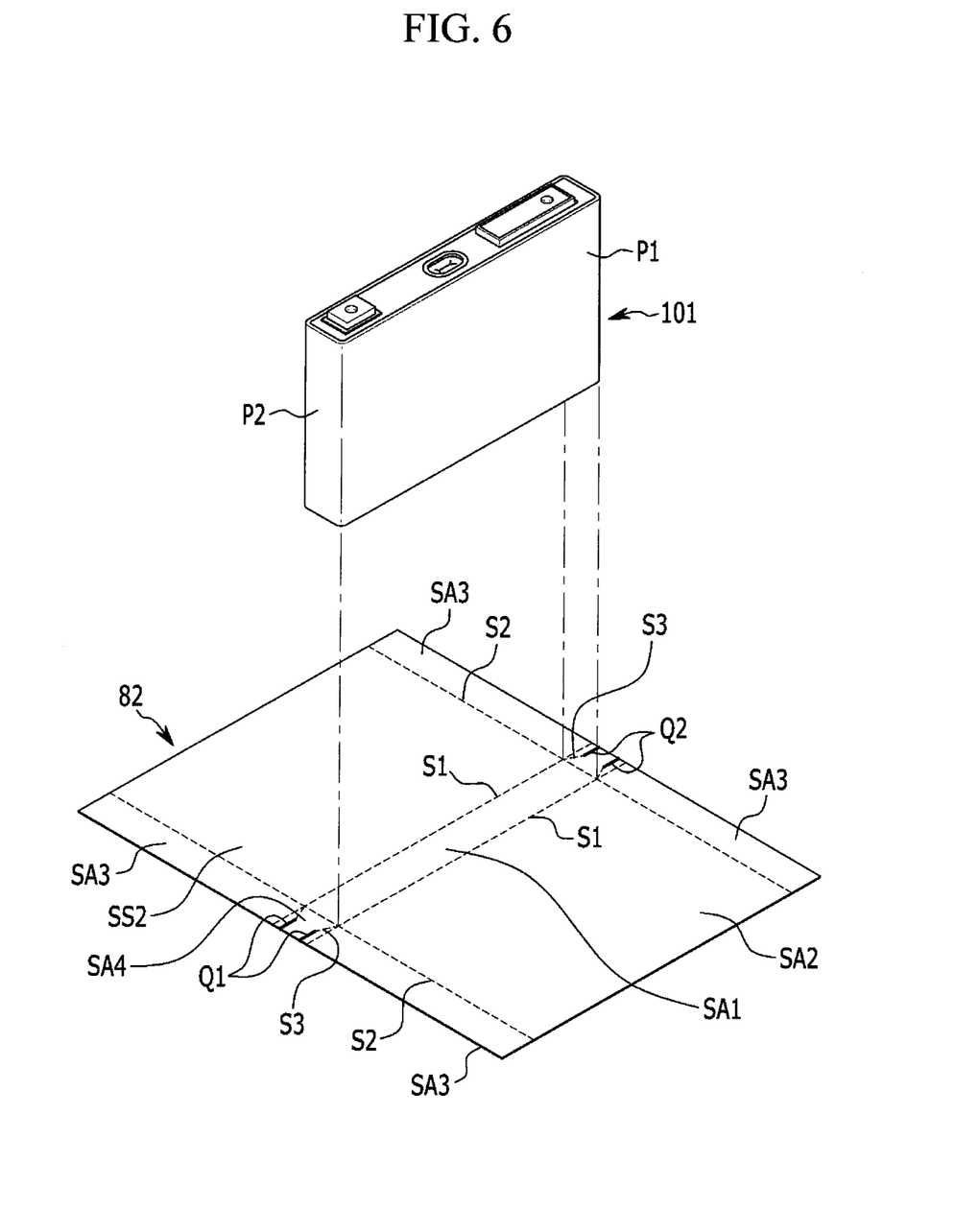
FIGS. 6-9 show a method of attaching a first insulation member to a case according to another exemplary embodiment.

As shown in FIG. 6, a battery assembly 101 and a first insulation member 82 are prepared, and the battery assembly 101 is provided on the first insulation member 82. The battery assembly 101 may be a battery assembly that is the same as or substantially similar to the battery assembly described above with respect to FIGS. 1 and 2, and the battery assembly 101 is formed by coupling the cap assembly to the case, in which the electrode assembly is received, at the opening thereof.

The first insulation member 82 is a sheet and has a pair of first folding lines S1, a pair of second folding line S2, a plurality of third folding lines S3, a pair of first incising lines Q1, and a pair of second incising lines Q2.

The pair of first folding lines S1 are separated from (e.g., spaced from) each other by a distance (e.g., by a first distance or a predetermined distance) and extend in parallel. Each of the first folding lines S1 may be provided in parallel to a long side of a bottom side of the case. Each of the second folding lines S2 may be provided to cross the first folding line S1.

The first incising lines Q1 and the second incising lines Q2 may be provided in parallel with the first folding lines S1, and a space between the first incising lines Q1 and a space between the second incising lines Q2 may be smaller than a space between the first folding lines S1.

The first insulation member 82 may be partitioned into a first area, a second area, a third area, and a fourth area by the first and second folding lines S1 and S2, and portions of the first insulation member provided in the respective areas will be referred to as a first small area SA1, a second small area SA2, a third small area SA3, and a fourth small area SA4. The first incising lines Q1 and the second incising lines Q2 may be provided in the fourth small member SA4. The third folding lines S3 may extend toward crossing points at where corresponding ones of the first folding lines S1 cross ones of the second folding lines S2 from ends of the first incising lines Q1 and ends of the second incising lines Q2.

The first insulation member 82 may be a polymer sheet including polyethylene terephthalate (PET) or a polyimide (PI), and an adhesive (e.g., an adhesive layer) may be provided on an inner side thereof. The first insulation member 82 may be attached to the battery assembly 101 by the adhesive.

The battery assembly 101 is disposed on the first insulation member 82 when the first insulation member 82 is spread out (e.g., is in a flat state, before it is folded), and the battery assembly 101 is disposed on the first small member SA1. Edges of the bottom side of the battery assembly 101 may be disposed along the first folding lines S1 and the second folding lines S2. Long-side edges of the bottom side of the battery assembly 101 may be disposed along the first folding lines S1, and short-side edges thereof may be disposed along the second folding lines S2. For convenience of description, lateral sides of the battery assembly 101 extending from long-side edges thereof will be referred to as first lateral sides P1, and lateral sides of the battery assembly 101 extending from short-side edges thereof will be referred to as second lateral sides P2.

Figure 7:
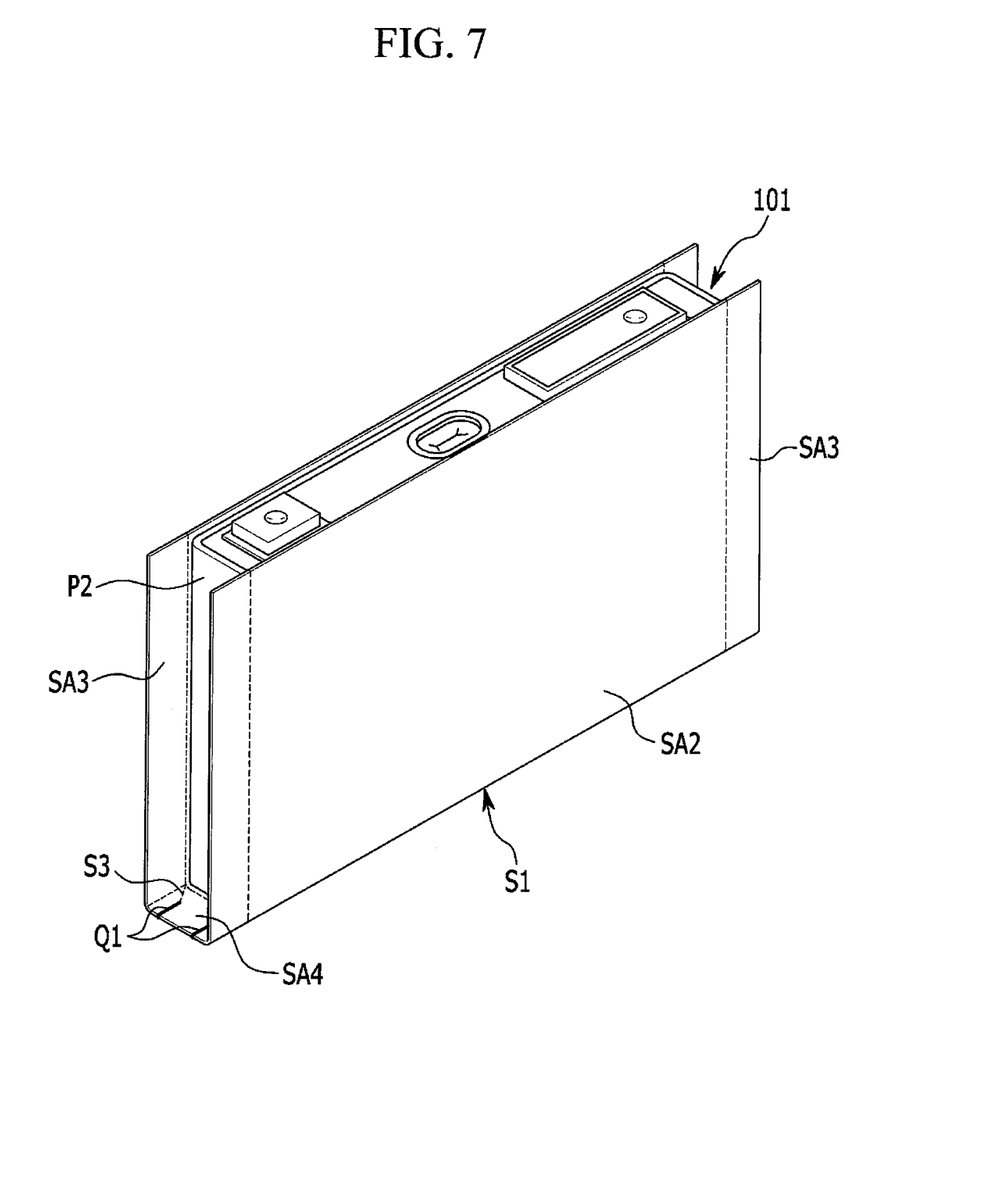

As shown in FIG. 7, the first insulation member 82 is folded along the pair of first folding lines S1 such that the second small area SA2 is provided on (e.g., contacts or is attached to) respective first lateral sides P1 (refer to FIG. 6) of the battery assembly 101.

Figure 8:
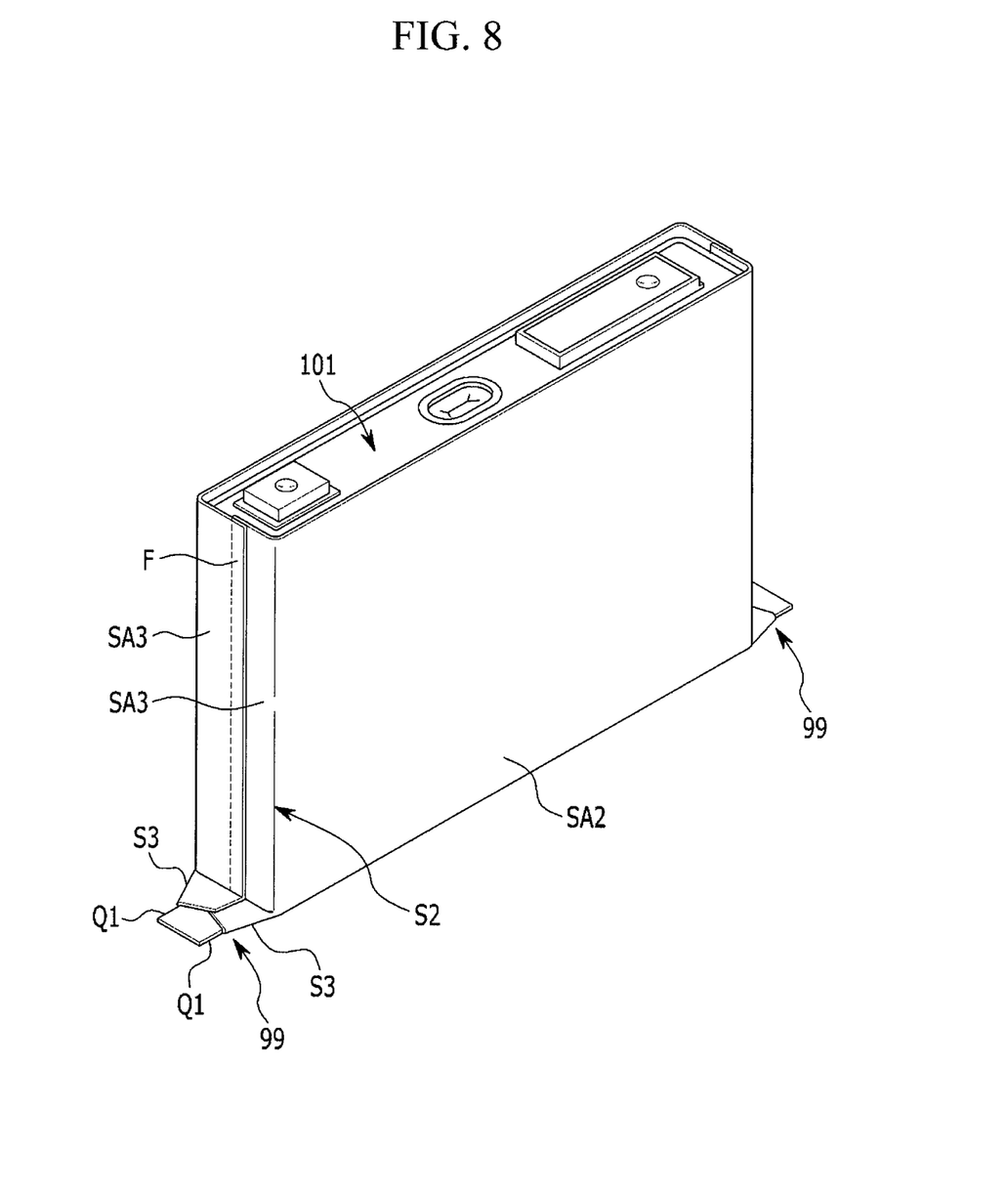

As shown in FIG. 8, the first insulation member 82 is folded along the second folding lines S2 provided between the second small area SA2 and the third small area SA3 to allow the third small area SA3 to contact respective second lateral sides P2 (refer to FIG. 6) of the battery assembly 101.

A width of the third small area SA3 may be greater than half the width of the second lateral side P2 such that edges of the third small area SA3 provided on the respective second lateral sides P2 of the battery assembly 101 may overlap each other to provide an overlapped portion (F).

When the third small area SA3 is folded, the fourth small area SA4 is also folded along the third folding lines S3 to provide a finishing member 99. The incised portions Q1 and Q2 provided on the fourth small area SA4 allow the fourth small area SA4 to be easily folded along the third folding lines S3.

Figure 9:
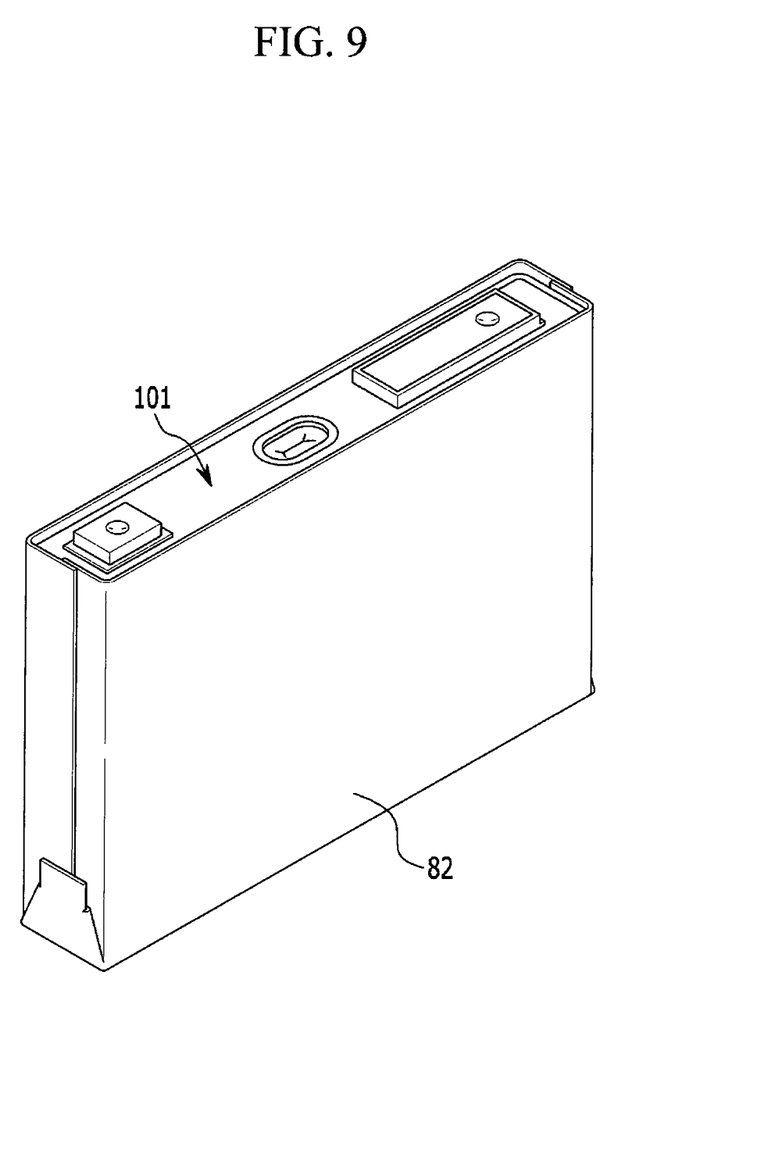

As shown in FIG. 9, the finishing member 99 is folded to overlap the battery assembly 101 (e.g., the finishing member 99 is folded to overlap a portion of the third small area SA3) and is thermally fused to be fixed thereto. When the sheet-type first insulation member 82 is used, the first insulation member 82 may be configured to surround the edges of the battery assembly 101 and to be folded around and attached to the battery assembly 101, thereby easily sealing various sizes of battery assemblies.

While this disclosure has been described in connection with what is presently considered to be practical exemplary embodiments, it is to be understood that the present invention is not limited to the disclosed embodiments. Rather, this disclosure is intended to cover various modifications and equivalent arrangements included within the spirit and scope of the appended claims and their equivalents.

What is claimed is:

1. A rechargeable battery comprising:
    an electrode assembly comprising a first electrode, a separator, and a second electrode;
    a case accommodating the electrode assembly, and having an opening at a side thereof for receiving the electrode assembly;
    a cap assembly coupled to the case at the opening, the cap assembly comprising a cap plate, the cap plate comprising a vent member and an embankment around a periphery of the vent member;
    a first insulation member surrounding the case, an extending portion of the first insulation member extending above the cap assembly; and
    a second insulation member on the cap assembly and contacting the extending portion of the first insulation member, the second insulation member being a coated layer,
    wherein the vent member is exposed through the second insulation member.

2. The rechargeable battery of claim 1, wherein the second insulation member contacts an inner side of the extending portion.

3. The rechargeable battery of claim 1, wherein an upper end of the extending portion and an upper end of the embankment have substantially the same height above the cap plate.

4. The rechargeable battery of claim 1, wherein the embankment is formed by pressing a bottom surface of the cap plate.

5. The rechargeable battery of claim 1, wherein the first insulation member comprises a thermal bonding layer configured to be melted at a side thereof facing the case.

6. The rechargeable battery of claim 1, wherein the cap assembly comprises a cap plate, the cap plate comprising:
    a first electrode terminal on the cap plate, and electrically connected to the first electrode through a first terminal connecting member;
    a second electrode terminal on the cap plate, and electrically connected to the second electrode through a second terminal connecting member; and
    an upper insulation member between the second electrode terminal and the case.

7. The rechargeable battery of claim 6, wherein a thickness of the second insulation member is the same as or less than a thickness of the upper insulation member.

8. The rechargeable battery of claim 1, wherein the first insulation member is a sheet and, when the first insulation member surrounds the case, the first insulation member has an overlapped portion on a lateral side of the case where the first insulation member overlaps itself.

* * * * *